United States Patent [19]

St. John

[11] Patent Number: 4,767,383

[45] Date of Patent: Aug. 30, 1988

[54] ADJUSTABLE TENSIONER FOR BELT AND CHAIN DRIVES

[76] Inventor: Richard C. St. John, 731 Bachtel St., SE., N. Canton, Ohio 44720

[21] Appl. No.: 926,341

[22] Filed: Nov. 3, 1986

[51] Int. Cl.$^4$ ............................................. F16H 7/12
[52] U.S. Cl. ..................................... 474/133; 474/111
[58] Field of Search .............................. 474/133–135, 474/101, 109, 111

[56] References Cited

U.S. PATENT DOCUMENTS

| | | | |
|---|---|---|---|
| 3,071,980 | 1/1963 | Brewer | 474/133 |
| 4,253,343 | 3/1981 | Black et al. | 474/135 |
| 4,313,729 | 2/1982 | James | 474/135 |
| 4,351,636 | 9/1982 | Hager | 474/135 |
| 4,362,062 | 12/1982 | Peterson | 73/862.47 |
| 4,392,840 | 7/1983 | Radocaj | 474/117 |
| 4,530,682 | 7/1985 | Gruber et al. | 474/133 |
| 4,557,709 | 12/1985 | St. John | 474/117 |

Primary Examiner—Thuy M. Bui
Attorney, Agent, or Firm—Reese Taylor

[57] ABSTRACT

A method of maintaining proper tension in belt or chain drive systems comprising attaching one end of a tensioning assembly to a mounting surface so as to permit unrestrained pivotal movement but negligible axial movement and positioning the opposed end adjacent the drive system belt or chain. A torquing tool is then applied at the mounting point and the assembly is rotated about a central axis until a predetermined torque value is attained and the assembly is locked against pivotal movement. The tensioner for carrying out the method includes an elongate arm with an idler pulley attached to one end. The opposed end receives a mounting member for securing the arm to a supporting surface first in pivotal relationship thereto and then in locked relationship. The mounting member also serves as a torquing member for applying the predetermined torque value.

20 Claims, 7 Drawing Sheets

ADJUSTABLE TENSIONER FOR BELT AND CHAIN DRIVES

RELATED APPLICATIONS

None.

BACKGROUND OF THE INVENTION

This invention relates to belt or chain drive systems, and relates in particular to a method and apparatus for setting the proper tension in belt and chain drives.

A common usage of such a belt or chain drive system would be in the automative industry wherein power is inputted into the system by the engine and various accessories are driven by an endless or serpentine belt. However, such a system is illustrative only and the principles of the invention described herein need not be limited to the endless type system.

Setting the proper tension in such belt drives is a continuing problems which becomes more severe as user demands for lower cost, less space, more power, higher reliability and fewer skills in assembly become more stringent. Furthermore, many common adjusting techniques lack accuracy and require iterations which lead to abandonment of the effort before precise tensioning is achieved.

A number of specific problems are encountered in the operation of systems of this nature and proper tension in the face of these problems is important. For example, often the input power is not smooth, but pulsates. Additionally, the load demands of the individual components such as, for example, an air conditioning compressor may be high and pulsating, or from other components such as, for example, a power steering pump or alternator may be high and intermittent or, for example, such as an air pump may be low and constant. Various combinations of these variables can also be encountered.

When a belt is kept at the proper tension, which may vary with the length of the belt, its product life is increased, and the cost of maintenance and repairs is greatly reduced. For example, excessive friction results if the belt is tensioned too tightly, and slippage or whipping results if the belt is tensioned too loosely. Both conditions shorten the life of the belt, and often one leads to the other, i.e., a loose belt which exhibits whipping is often remedied by over tightening which results in power loss due to excessive friction.

In general practice, the tension of a belt is measured by utilization of a belt tension scale. The scale is placed on the belt itself, a force is applied to the belt by the scale, and a reading of the tension is obtained. This commonly used method may actually deleteriously deform the belt as the belt is bent or stretched during the process. Additionally, the accuracy of the measurement is questionable as a secondary tension is applied in reading the belt tension.

Belts such as are involved herein are thus difficult to tension correctly at the time of manufacture and initial assembly, and are even more difficult to tension correctly after being placed n service. Unfortunately, in view of the need for longer product life and increasingly stringent product liability requirements, these difficulties assume fairly major dimensions.

BRIEF DESCRIPTION OF THE PRIOR ART

Examples of various tensioners of the type generally involved can be seen in Black U.S. Pat. No. 4,253,343; James U.S. Pat. No. 4,313,729; Hager U.S. Pat. No. 4,351,636; Peterson U.S. Pat. No. 4,362,062; Radocaj U.S. Pat. No. 4,392,840; Gruber U.S. Pat. No. 4,530,682 and St. John U.S. Pat. No. 4,557,709. These patents illustrate various designs of tensioners, all of which must deal, in varying ways, with the problems previously discussed.

Some solutions to these problems have been attempted.

One approach is to employ fixed center tensioners, measure belt tension on the belt and then adjust during initial manufacture. The difficulty is that this provides uncertain results during manufacture and even less certain results in the field where the necessary measuring equipment and trained personnel may not be available.

On the one hand the fixed center tensioner does maintain the desired relationship between approaching and leaving tension in the belt system and does not oscillate unnecessarily since in essence, the belt is the only elastic member in the system. However, as the belt ages and stretches, its initial static tension diminished and it must be retensioned.

Another approach is to employ an automatic or dynamic belt tensioner wherein spring powdered products are used which do have the potential for providing the correct constant static tension over the life of the product without adjustment. The difficulty, however, is that problems are encountered due to mechanical wear and deformation of the tensioner and in response to high amplitude oscillations in the system and in maintaining the correct dynamic tension.

Neither of the common solutions just described reaches the optimum condition because of the shortcomings just mentioned. Those optimum conditions would be as follows:

1. To provide the correct static tension with simple tools;
2. To permit accurate belt tension without measuring that belt tension directly;
3. To permit easy tensioning both at the time of manufacture or in the field;
4. To provide such an assembly with no moving wear surfaces except for the conventional idler pulley.

SUMMARY OF THE INVENTION

It is accordingly the principal object of this invention to produce a method and apparatus for achieving these optimum conditions and avoiding the shortcomings of the prior art.

In achieving that object, four variations of the method and apparatus are disclosed herein, all of which have in common the provision of providing torque about the pivot axis of the tensioner so as to achieve a predetermined torque value and a predetermined static belt tension.

It has been found that conventional engineering analysis can be effective to account for almost any set of static conditions so as to predict, in any system, the torque on the pivoted arm tensioner that will provide any desired tension value under any set of conditions. Similar analysis will allow the predetermination of the amount of belt take-up that the tensioner can provide as the belt ages and stretches as well as the relationship between belt tension and belt length changes.

It has therefore been found that by utilizing this method and apparatus, a single tensioner can be adapted to a large variety of systems and torque and tension can be accurately predetermined by proven analytical techniques so that little or no testing or development effort is required to achieve the desired values.

Furthermore, by utilization of the method and apparatus of the application, simple tools, which are readily available, are sufficient to tension the system with acceptable accuracy and the complexities and dangers of tensioners with stored energy devices such as springs or hydraulic and pneumatic devices are avoided.

Finally, utilization of the method and apparatus of the invention permits those with very modest skills and training to accurately adjust tension either at the time of manufacture or during field service.

Accordingly, production of an improved method and apparatus for adjustable tensioners for belt and chain drives of the character above-described becomes the principal object of this invention, with other objects thereof becoming more apparent upon a reading of the following brief specification considered and interpreted in view of the accompanying drawings.

BRIEF DESCRIPTION OF THE PREFERRED EMBODIMENTS

Figure 1:
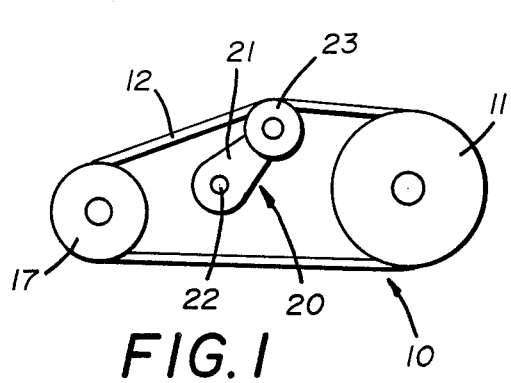
FIG. 1 is a schematic view of a typical belt drive system showing front side tensioning.
Figure 1A:
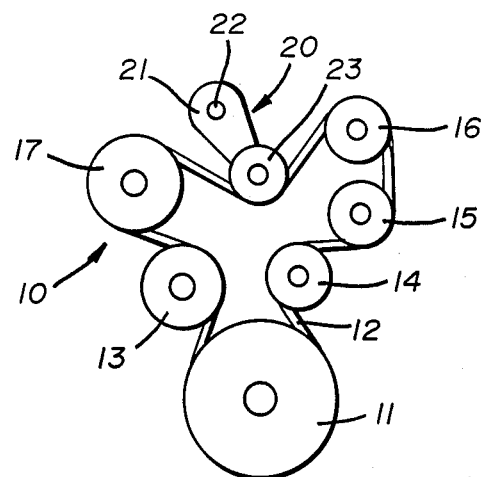
FIG. 1A is a schematic view of a typical belt drive system showing back side tensioning.

Referring first to FIG. 1A, a typical serpentine belt drive system 10 of the general character of the systems involved with this invention is schematically illustrated wherein a power transmission device is connected to the prime mover, indicated by the numeral 11, and wherein a belt 12 is passed about the prime mover pulley and about a series of pulleys 13 to 17 which are connected to various accessories which are driven by the belt 12. Although the embodiment shows employment of a flat belt 12, it should be appreciated that any type of belt or chain is suitable without departing from the spirit of the invention, such as "Poly-V" belts, some V-belts, roller chains, silent chain, rope or O ring drives, or the like.

It will be noted that FIG. 1 illustrates tension being applied to the front side of the belt while FIG. 1A illustrates tension being applied to the back side of the belt.

Still referring to FIGS. 1 and 1A, a pivoted arm belt tensioner is generally indicated by the numeral 20 and, in simple form, includes a body 21, one end of which is pivotally mounted as at 22 to a mounting surface and the other end of which carries a tensioner pulley 23 which engages the belt 12 so that, depending upon the angle of the arm 21, varying degrees of tension can be applied to the belt and, therefore, to the belt system. As previously noted, these FIGURES illustrate endless or serpentine systems although the principles involved are also applicable to other belt or chain drive systems.

Figure 2:
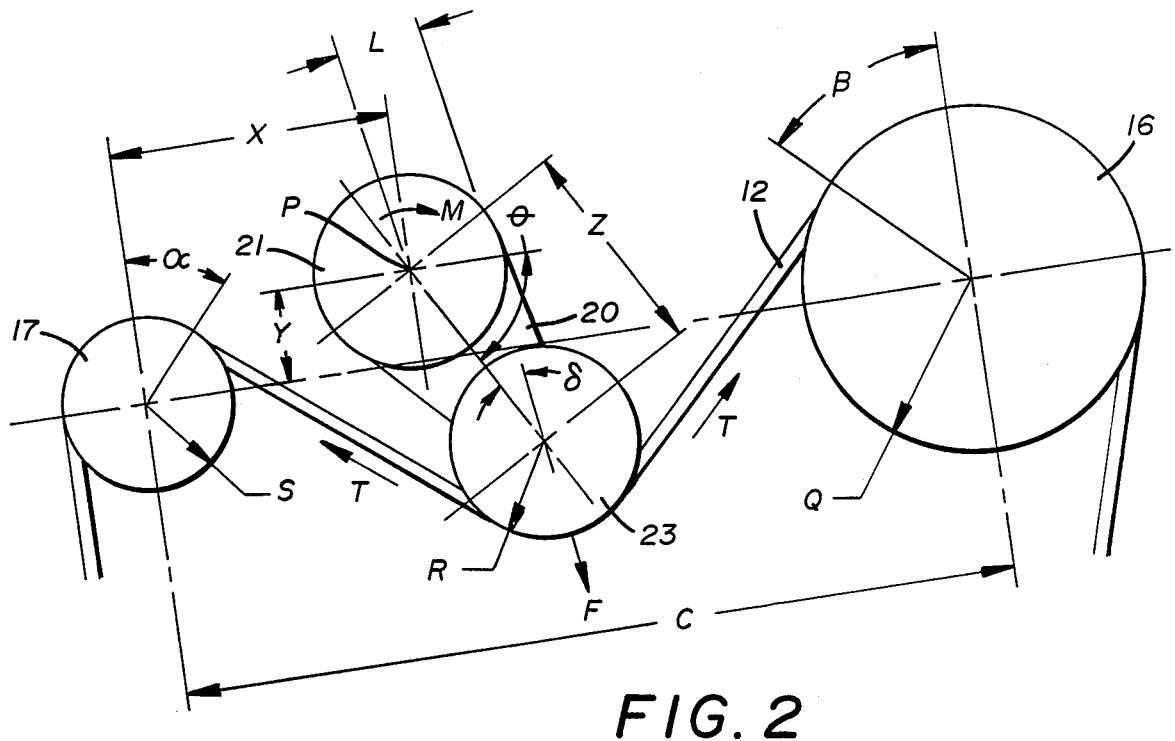
FIG. 2 is a segmented, schematic view of the system of FIG. 1A showing the adjustable tensioner in position.

An enlarged, schematic view of FIG. 1A showing the pivoted arm belt tensioner 20 and sheaves 16 and 17 is depicted in FIG. 2. In general, the belt tensioner 20 of the subject invention facilitates belt length change, by providing a constant static tension over a relatively large range of arm rotation. The pivoted arm tensioner 20, and each of its modifications presented herein, operates on the general basis that rotation of the arm increases $\theta$, the arm angle, and decreases $\delta$, the idler pulley angle, which results in a need to increase the force (F) that the tensioner 20 effects on the belt 12. This force (F) is proportional to the applied torque (M) divided by the perpendicular distance (L) between the automatic belt tensioner 21 and the idler pulley 23 as measured from the line of action of the force. Hence an essentially constant tension can be obtained over a wide range of arm angles when the proper torque M is applied and when the tensioner is properly positioned in the system.

This torque M which is to be applied can be determined by the mathematical relationship $$M = 2(T \times Z) \times \sin(\delta) \times \sin((\alpha + \beta)/2) \tag{1}$$

wherein M is the torque which is to be applied at arm angle $\theta$, T is the target belt tension, Z is the center-to-center length of the tensioner 21, $\delta$ is the idler pulley angle, and $\alpha$ and $\beta$ are the angles of the upstream and downstream sheaves 16 and 17.

When the proper steps are take to optimize the location of the power transmission system, the adjustable tensioner 20 of the present invention enables an essentially constant tension (T) over a broad range of arm angles ($\theta$), simply by providing an appropriate unvarying torque (M). This is exemplified in the graph of FIG. 3 and its numerical interpretation shown in Table 1 wherein a 260 lb.-torque has been applied to a tensioner 20 of a system 10 at point P.

TABLE 1

| BELT TENSION (T) OVER A VARIETY OF ARM ANGLES ($\theta$) FROM 260 lb.-in. TORQUE | |
|---|---|
| Arm Angle ($\theta$) (degrees) | Belt Tension (T) (lbs) |
| 0 | 184 |
| 5 | 146 |
| 10 | 123 |
| 15 | 109 |
| 20 | 100 |
| 25 | 95 |
| 30 | 95 |
| 35 | 92 |

TABLE 1-continued

BELT TENSION (T) OVER A VARIETY
OF ARM ANGLES (θ) FROM
260 lb.-in. TORQUE

| Arm Angle (θ) (degrees) | Belt Tension (T) (lbs) |
| --- | --- |
| 40 | 92 |
| 45 | 94 |
| 50 | 96 |
| 55 | 99 |
| 60 | 102 |
| 65 | 104 |
| 70 | 106 |
| 75 | 107 |
| 80 | 103 |
| 85 | 91 |

As can be seen, the single non-varying torque imparts an essentially constant tension over all arm angles θ from about 17° to 85°. The specific parameters of the system from which the calculations have been obtained are: X=3.5 in.; Y=3.0 in.; C=12.250 in.; Q=2.875 in.; R=1.570 in.; S=2.125 in.; Z=3.500 in.; M=260 lb.-in.

As will be appreciated by those skilled in the art, typical variations over similar ranges with conventional tensioners are much larger. This constant torque/tension relationship is provided by setting the torque M of the novel pivoted arm tensioner 20, or any of its specific embodiments disclosed hereinbelow, at the foregoing predetermined value obtained from equation 1.

Although constant tension is desirable in many cases, it should be appreciated that in some cases varying tension in a predictable manner is desirable. The concepts presented hereinbelow illustrate that tension can be accurately provided by applying torque about the center pivot because the torque/tension/arm angle relationship can be predetermined. As such, the concepts of the present invention can be applied in these cases involving varying tension without departing from the spirit of the invention.

One specific form of the present invention will now be described with reference to FIGS. 4 and 5 of the drawings.

In this form of the invention, the tensioning assembly 120 includes an elongate arm 121, one end of which has a central pivot aperture 121a designed to receive a pivot screw 122. The pivot screw 122 passes through the aperture 121a in the arm 121 and has its threaded end received in a similar aperture 130a in a mounting base 130 such as an engine block. A retaining nut 122a is received on the threaded end of the screw 122, and in this fashion one end of the arm 121 can be mounted for pivotal movement about the central axis of the screw 122. Alternatively, screw 122 may be threaded directly into mounting base 130.

Figure 5:
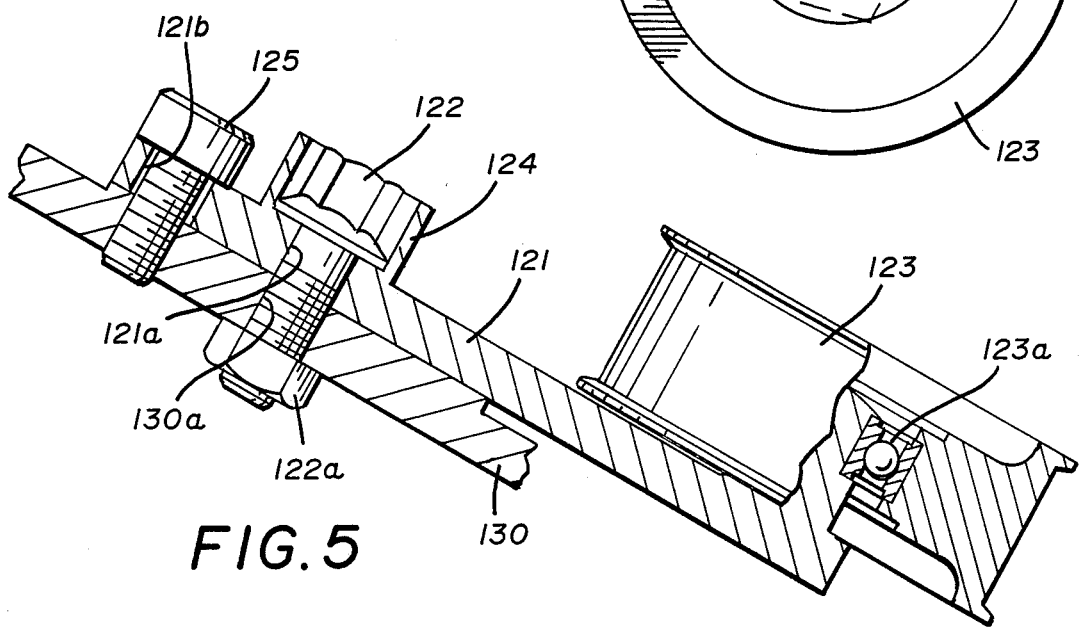
FIG. 5 is a side elevational view of the tensioner of FIG. 4, partially in section.

The same end of the arm 121 has an arcuate slot 121b therein adjacent to its peripheral edge for reception of the shank of a lock screw 125 which is threaded into the base 130, as clearly shown in FIG. 5 of the drawings. Also received on one peripheral edge surface of the arm 121 are a series of optional angle markings 126 and pointer 127 provided adjacent angle markings 126.

The opposed end of the arm 121 carries the conventional idler pulley 123 designed to engage a belt, such as the belt 12 of FIG. 1. This pulley is mounted with a conventional bearing assembly such as 123a.

Figure 4:
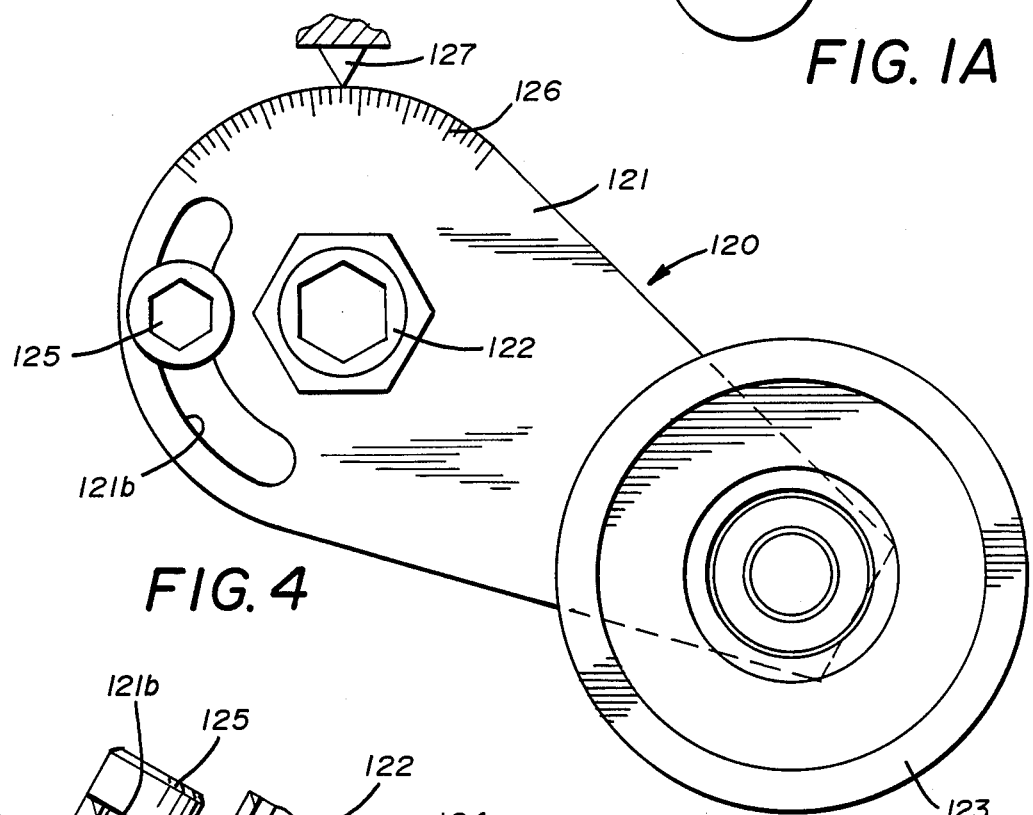
FIG. 4 is an elevational view of one form of adjustable tensioner.

In operation of the form of the invention illustrated in FIGS. 4 and 5 of the drawings, the arm 121 is mounted on the mounting surface 130 and located by the pivot screw 122. The lock screw 125 and the retaining nut 122a are tightened sufficiently to permit the arm 121 to pivot about the axis of the pivot screw 122, but to avoid any apparent axial motion.

As can be seen from FIG. 5 of the drawings, the central torquing head 124 projects upwardly from the front face of the arm 121, and in operation a suitable torque wrench having an appropriate sized socket is placed on the central torquing head 124, and the torque necessary to provide the desired predetermined tension is applied by rotating the arm, first so that the pulley 123 comes into contact with the belt, and then further until the desired tension is achieved.

Figure 14:
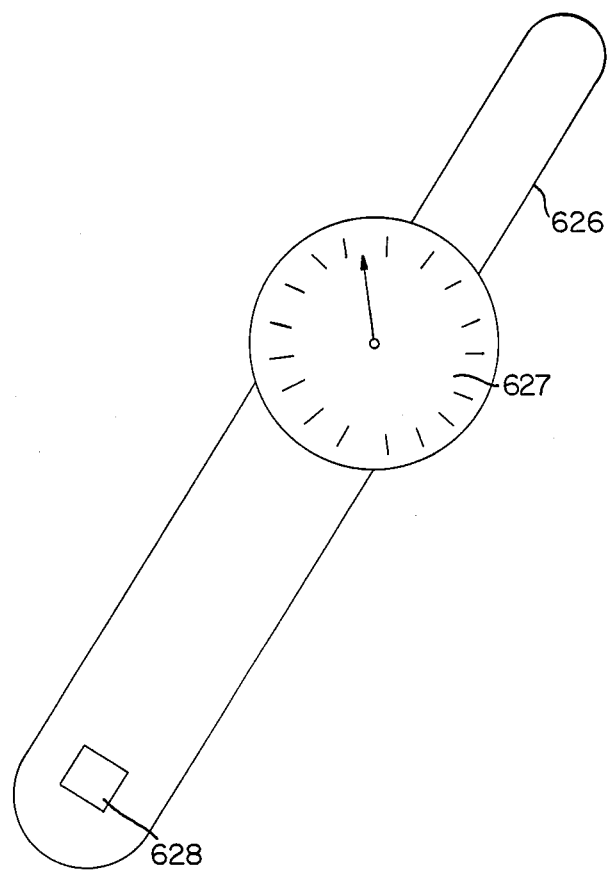
FIG. 14 shows a calibrated torque wrench.

This desired tension obtained by providing the proper torque M at torquing head 124, can be measured by the appropriate angle markings 126 matched with the pointer 127 which is affixed to the mounting surface 130. However, in the case where the proper torque is applied to a properly located adjustable tensioner 120 within a system 10 neither the markings nor the pointer are necessary. Moreover, the torque may be applied through a calibrated torque wrench, as shown in FIG. 14, whereby the proper torque/angle relationship is accounted for within the wrench 626 and just the angle is displayed on scale 627 of the wrench. Wrench 626 is engageable with torquing head 124 by means of the keyed slot 628.

When the proper torque/angle condition is reached, the lock screw 125 is tightened, following which the retainer nut 122a is tightened and the tensioner is operational.

This construction and method permits the pivot screw 122 and/or the lock screw 125 to be replaced by user supplied studs and nuts if desired.

Figure 5A:
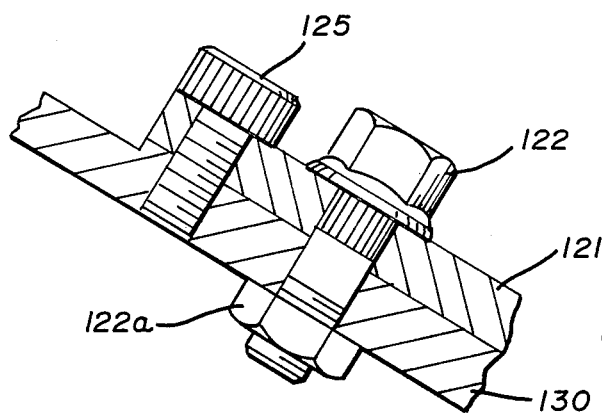
FIG. 5A is a partial sectional view of a modified form of the locking and adjusting means of FIGS. 4 and 5.

An alternative configuration can also be employed wherein a knurled or keyed pivot screw 122 is fixed to the arm 121 and the tensioner torque can be applied therethrough as shown in FIG. 5A. It should also be noted that the slot 121b is not the only operable structure possible. For example, the slot could be eliminated and a C-shaped clamp could be substituted for it and for screw 125. The pointer could then be secured by screw 122 directly on the tensioner.

It is also possible to omit the lock screw 125 if the pivot screw 122 is properly keyed to the arm and is of the correct size and rotation to tighten as the belt tension increases, and if the proper friction conditions and retaining nut 122a tightening are provided along with an appropriate lock-washer or locking means.

Figure 6:
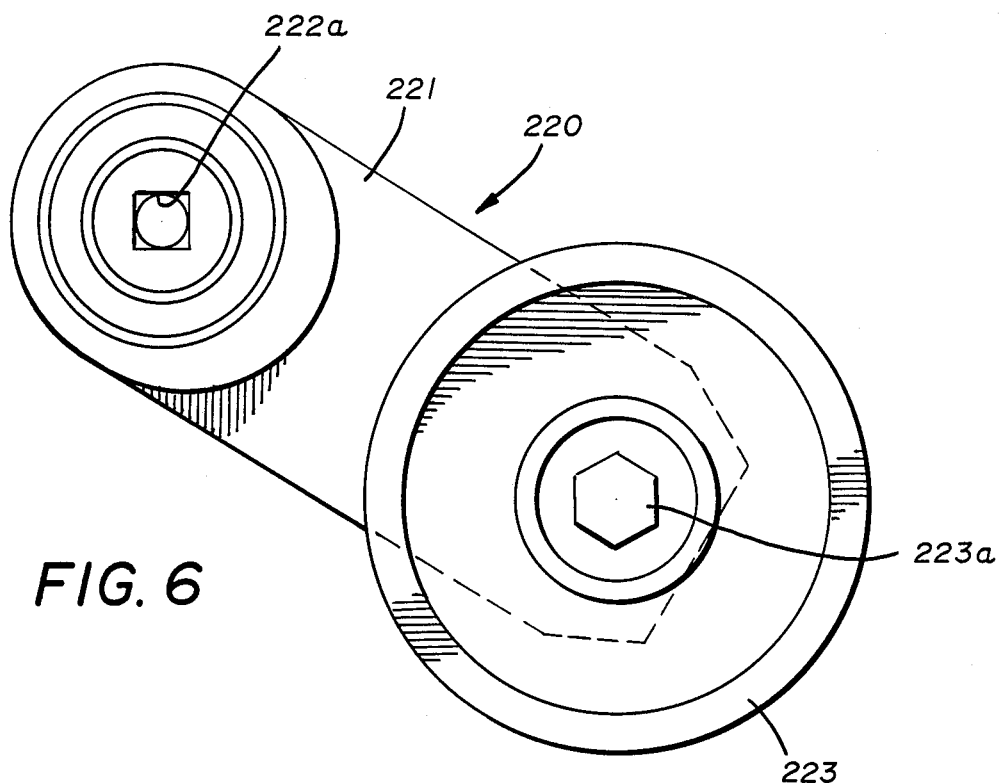
FIG. 6 is an elevational view of a modified form of the invention.
Figure 7:
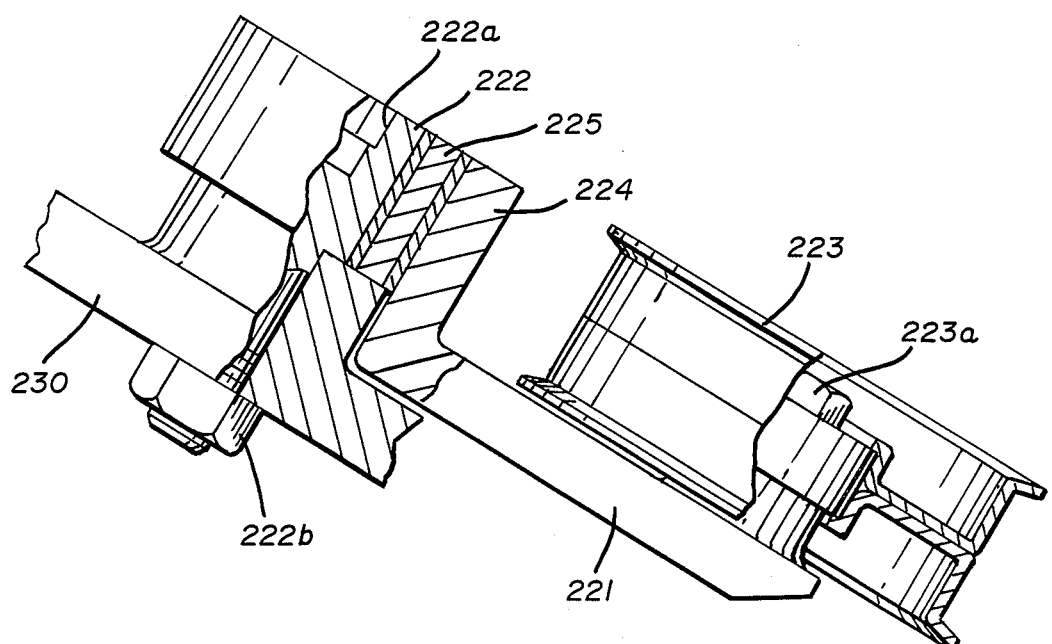
FIG. 7 is a side elevational view of the tensioner of FIG. 6, partially in section.

Turning then to FIGS. 6 and 7 of the drawings, a further modification of the basic concept is disclosed.

In this form of the invention, the tensioner assembly, is generally indicated by the numeral 220 and includes an elongate arm 221 having an idler pulley 223 attached to one end and secured in place by a conventional pulley retaining screw 223a. In that regard, this portion of the assembly differs from the form illustrated in FIGS. 4 and 5 of the drawings essentially only in the way in which the pulley is mounted on the arm and the pulley mounting is interchangable between the two modifications.

The opposed end of arm 221, however, differs considerably in structure.

It will be noted that again a mounting surface 230 is provided. In this configuration, however, the arm 221 has an upstanding hub 224 with a long, thin elastomeric torsion/compression bushing 225 concentrically received therein. Radially inboard of the bushing 225 is a lock screw 222 having a central torquing socket 222a. The lock screw 222 projects through the mounting surface 230 and has a threaded end which receives lock nut 222b.

In utilizing the form of the invention illustrated in FIGS. 6 and 7 of the drawings, the tensioner is mounted loosely on mounting surface 230 and a torque wrench is inserted into the central torquing socket 222a. The tensioner is then torqued to the design level in accordance with equation 1 with the lock unit 222b retained just loosely enough to permit rotation with essentially no drag but to resist any appreciable axial movement.

Once the predetermined torque has been applied, the lock nut 222b can be tightened. It is also possible to provide auxiliary locking means such as lock washers between the lock nut and the mounting base 230 to resist rotation from belt loads. A similar provision could be made between the hub 222 and the top surface of the mounting base 230. Additionally, the indicia 126 and the pointer 127 illustrated in FIG. 4 could be provided for reference if variable torque is required.

In this modification the line of action of the belt on the pulley 223 generally parallels the longitudinal center of the bushing 225. This bushing, as previously noted, is long and thin to provide a high shape factor which helps it support large radial or torsional loads without overstressing the elastomer. This shape also results in high radial and torsional spring rates, i.e., large changes in force or torque resulting in small radial or torsional deflections respectively. The bushing, therefore, permits small tensioner deflections and some diminution of belt tensions when extremely high loads are encountered or in the event of eccentric, rotating drive train components such as nonconcentric pulleys. Since drive eccentricities eventually become additive, it is not unrealistic to encounter static belt tensions that have short term extremes varying from zero to twice or even higher multiple static tensions. These variations can seriously reduce the operational life of drive line components. The bushing reduces the magnitude of these variable loads to an acceptable level and thereby enhances the life of the belts, bearings and other components.

Figure 8:
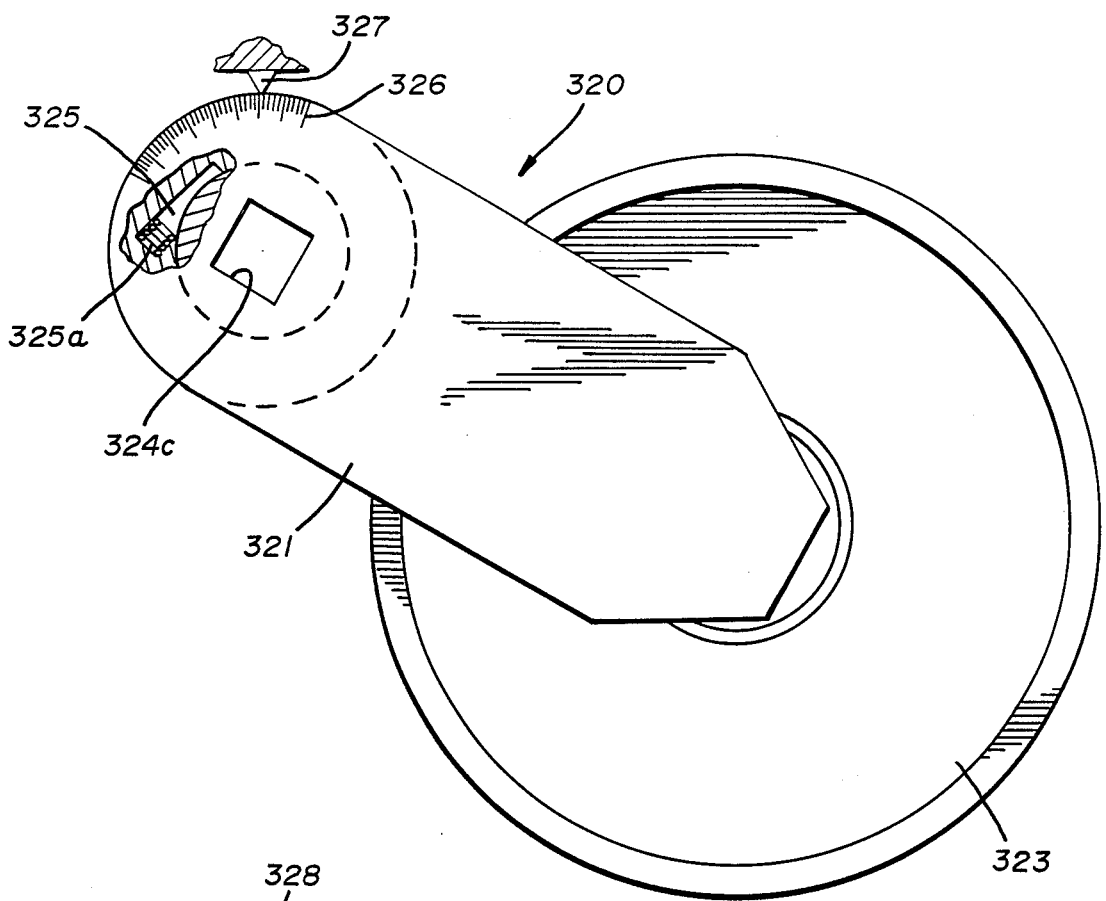
FIG. 8 is an elevational view of still another modified form of the invention.
Figure 9:
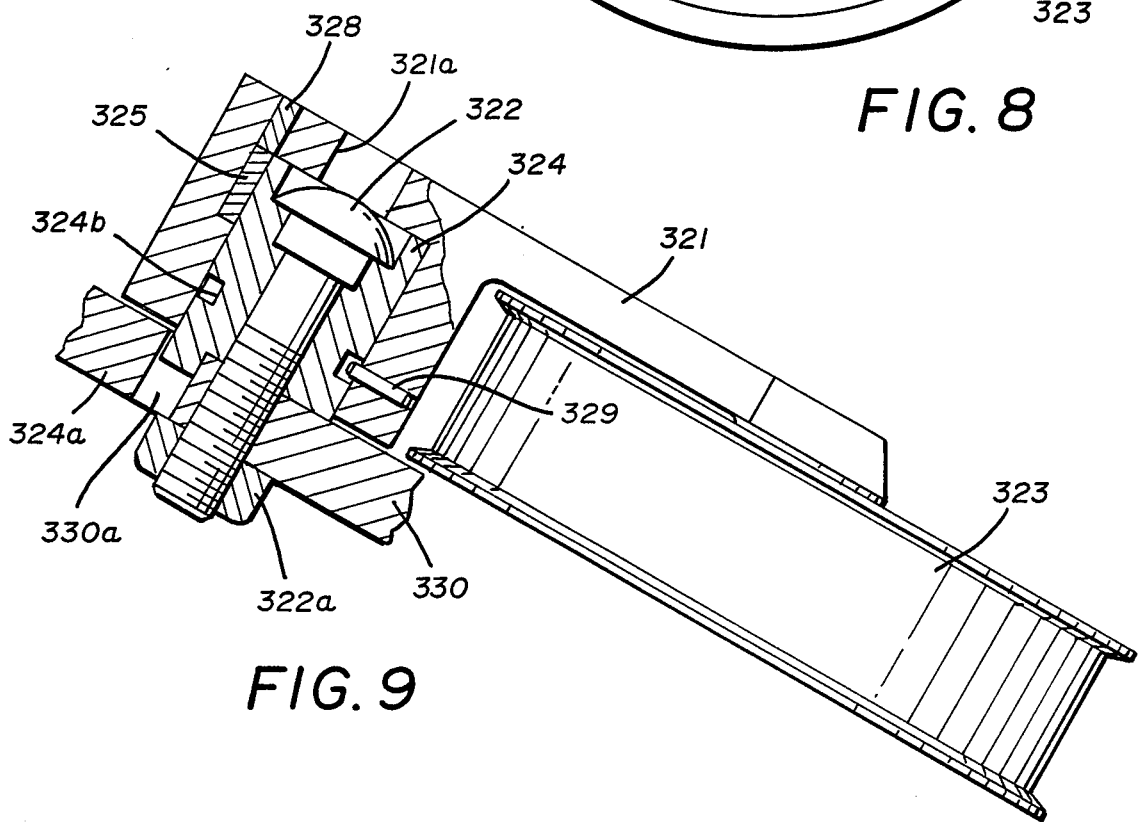
FIG. 9 is a side elevational view of the tensioner of FIG. 8, partially in section.

Turning next then to FIGS. 8 and 9, a still further modification of the basic concept is disclosed.

In this form of the invention the tensioner assembly is generally indicated by the numeral 320 and includes an elongate arm 321 with a suitable idler pulley 323 mounted on one end in a conventional fashion.

The opposed end of the arm 321 receives a pivot screw 322 which is secured to a mounting surface 330 by a lock nut 322a. This pivot screw 322 is received within a hub 324, which is in turn retained against axial motion by a retaining pin 329 and which is held in place by a one way locking slide 325 and a closing plug 328.

In use of the form of the invention illustrated in FIGS. 8 and 9 the tensioner 320 is mounted on the usual mounting surface 330 and positioned so that an optimal protrusion 324a from the hub 324 enters a cavity 330a in the base to prevent rotation by any means other than friction.

The retaining pin 329 is received in an aperture in the arm 321 and projects into an annular recess 324b in the hub 324 to prevent axial separation. The pivot screw 322 is in the form of a carriage bolt which prevents rotation between itself and the hub 324.

The one way locking device 325 has a surface that matches the hub and a flat mating surface in the arm 321 in contrast to the usual ball or roller arrangement. This permits the use of broad contact surfaces to permit the necessary high forces to be developed without generating high contact stresses. As a result, soft materials such as aluminum, zinc or organics that are commonly associated with low cost manufacture can be used without being unduly brinelled or deformed.

In operation of this form of the invention, the proper tension can be obtained by attaching to the tensioner a torque wrench or other similar device through the torquing socket 321a of the arm 321 to apply the necessary predetermined torque at the angular location identified in this instance by the optional indicia 326 and pointer 327. At this point it will be understood that the pivot screw 322 and the lock nut 322a will be tightened sufficiently to permit such rotation but prevent axial movement.

In the event too much torque is applied, the tensioner can be returned by simply removing the closing plug 328 and inserting a tool between the leading edge of the one way locking slide 325 and the arm 321 and prying the slide back against the force of the slide spring 325a. This permits the slide to unlock and permit the belt to return to an essentially zero tension condition. Following this, the belt may be retensioned. The process, of course, could be repeated as often as desired.

It is believed that in some cases applying torque to the tensioner while releasing the lock slide 325 may be desirable to ease the release of the slide and minimize spring-back of the tensioner caused by the sudden release of the belt tension.

Figure 10:
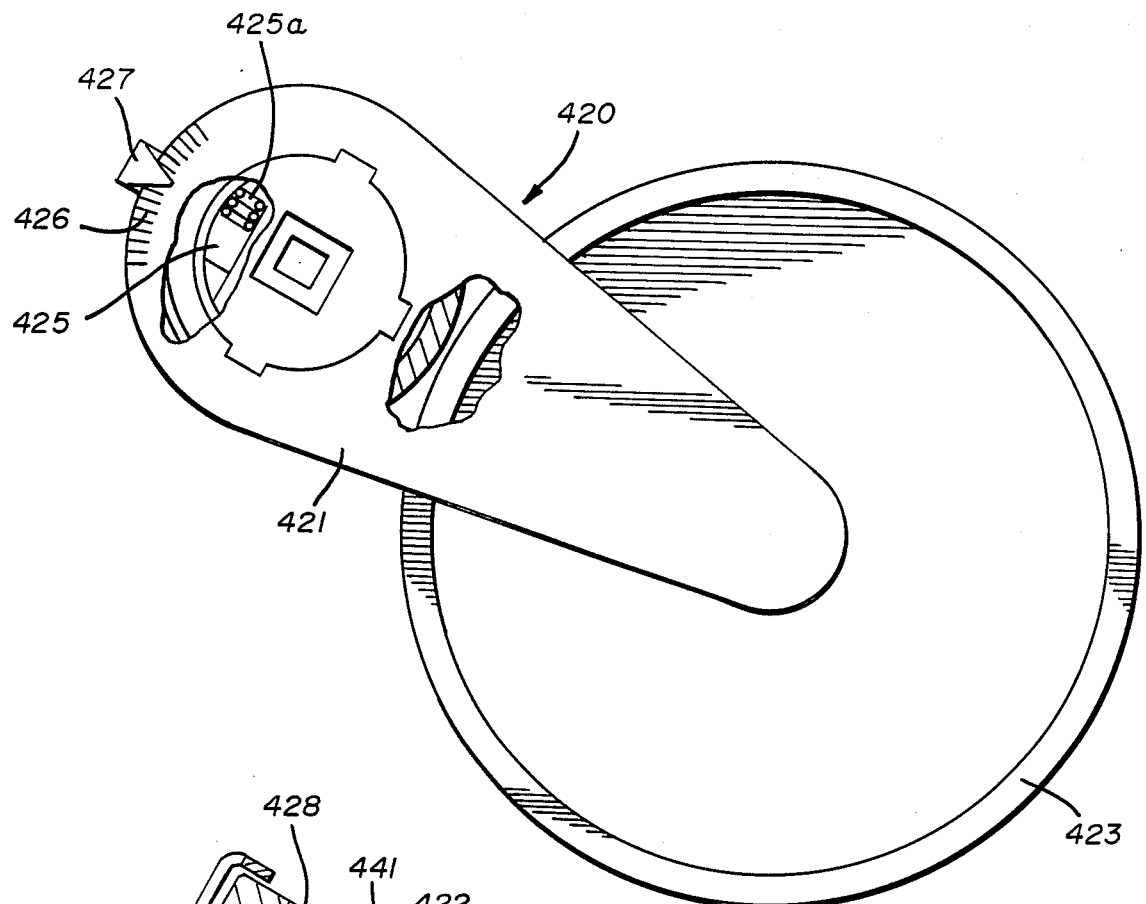
FIG. 10 is an elevational view, partially broken away, of still another modified form of the invention.
Figure 11:
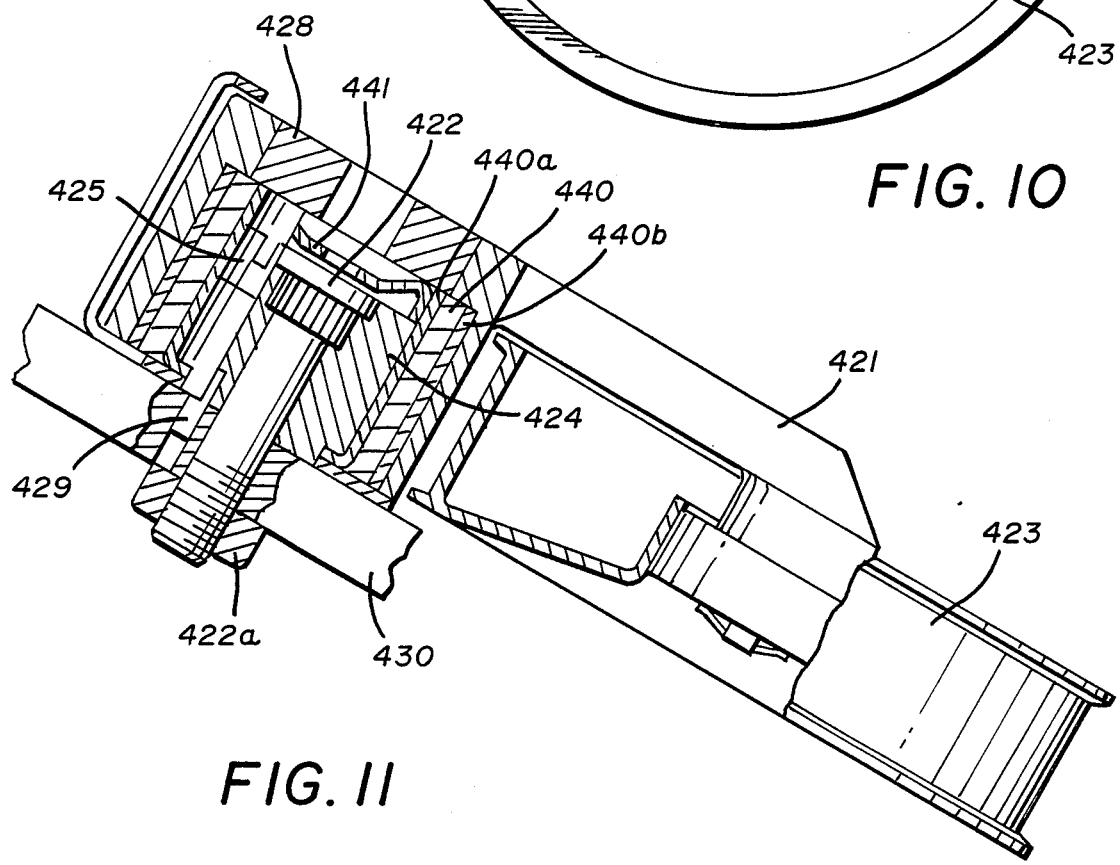
FIG. 11 is a side elevational view of the tensioner of FIG. 10, partially in section.

Turning next then to FIGS. 10 and 11 of the drawings, a still further modification will be described. Here the tensioner assembly 420 includes the arm 421 and the idler pulley 423 with its usual associated bearing assembly.

The opposed end of the arm 421 includes a clamping screw 422 secured to the mounting surface 430 and held in place by the lock nut 422a.

This end of the arm also includes a one way locking slide 425 and associated spring 425a which engages the hub 424 and which is held in place by the locating pin 429.

In this form of the invention, an elastomeric torsion/compression bushing assembly is employed, including the bushing 440 and inner and outer hoops 440a and 440b. A closing plug 428 is also employed.

Finally, a reset 441 is received over the top of the hub 424.

In use or operation of the modification of FIGS. 10 and 11, the tensioner will be installed on the mounting surface 430 with the clamping screw 422 and the nut 422a being tightened sufficiently to prevent axial separation but permit rotational movement. The hub 424 and the arm are located by the alignment or locating pin 429. As before, a torque wrench is inserted into the central torquing socket permitting the arm to be pivoted until the predetermined value is attained.

The locking slide 425 consumes little torque when operating in its slipping direction, but will resist large values of torque when rotated in its self-energized direction, and can even be made self-locking so that the mechanism will be damaged or destroyed before slipping.

The torque values in both directions can be determined either analytically or empirically as discussed hereinabove and can be compensated for in the torque specification.

After the proper torque value is attained, the torque about the clamping screw 422 enhances the tension in the belt and will remain at the set level because of the self-energizing nature of the locking slide 425, operating in conjunction with the hub 424 and the inner hoop 440a of the torsion bushing 440 to prevent counter-rotation.

In this form of the invention, torque is applied through the inner hoop 440a of the bushing 440 because the elastomeric member 440 permits relative rotation of the inner and outer hoops.

Thus, if the initial torque were applied through the arm 421, i.e., through the outer hoop 440b, the relative rotation would be expressed as spring back of the arm 421 when the wrench is removed. Consequently, the final tension in the belt would be less than anticipated and the quantitative tensioning effort a failure. Although compensation can be made for spring back, better tensioning accuracy can be had if this avoided or rendered unnecessary. If the torsional rate of the torsion bushing and the working strength of the belt are high enough, the torque may be applied through the outer hoop 440b with little ill effect.

If it is desired to reset the tensioner, a small screwdriver, or other appropriate tool, is inserted through the central torquing socket and into the reset socket 441 in the reset. This will then be turned clockwise to release the locking slide and the spring back from the belt will return the tensioner to a relaxed belt position. Further, return rotation can be had by continuing to rotate the reset and moving the tensioner into the desirable position by hand.

The modification of FIGS. 10 and 11 discloses that the inner hoop 440a of the torsion bushing 440 is rolled radially inwardly at its bottom toward the clamping screw 422 so that a stop in the hub will permit free relative rotation between the hub and the torsion bushing, but will restrict axial motion. Axial motion of the arm is prohibited by a press fit between it and the outer hoop 440. There is little axial deflection of the bushing 440 because of its high shape factor, which also contributes to its ability to handle high torsional and axial loads without overstressing.

Investigation of the geometry of a system containing any of the foregoing belt tensioners of the present invention, viz., 20, 120, 220, 320, or 420, by use of a mathematical model shows that the torque/tension relationships are very sensitive to locational parameters. In particular, the torque/tension relationship is highly sensitive to the placement of the tensioner, i.e., the parameters X and Y of FIG. 2. This sensitivity holds true for any pivotal arm tensioner whether it is statically or dynamically loaded by springs, hydraulics, pneumatics or the like. Therefore, in order to obtain optimum results of the tensioners of the present invention, proper placement is essential.

There are many industrial and commercial applications in which the lack of capability or opportunity prevent accurate location of the tensioner in the system. The loss of location accuracy can significantly diminish the ability of the tensioner to achieve and/or maintain the target tension.

Figure 12:
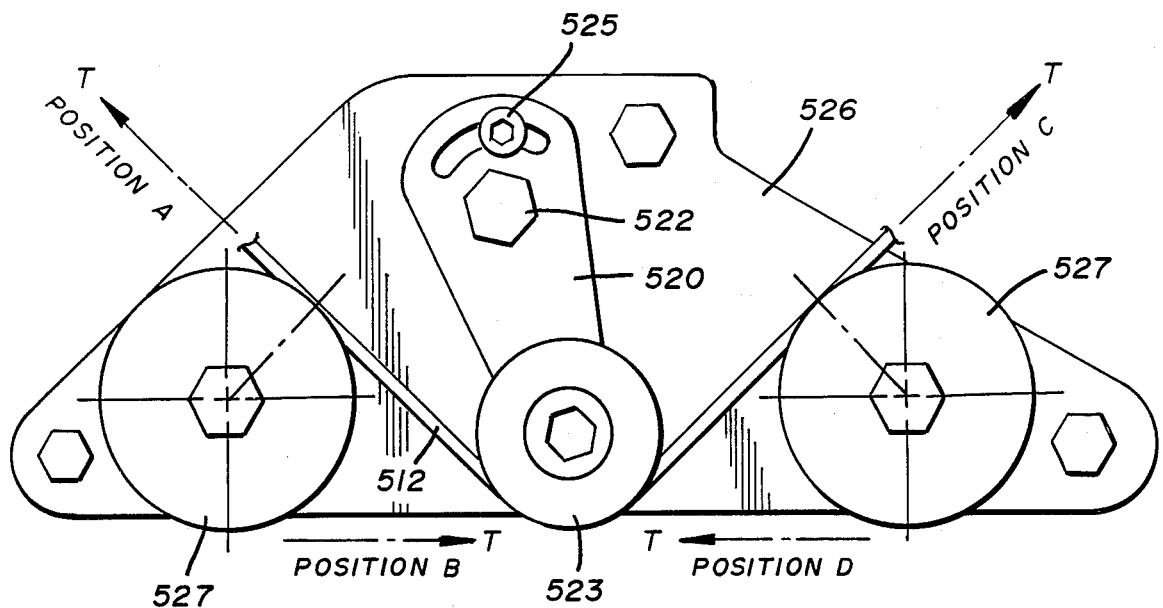
FIG. 12 is a schematic view of a tensioner sub-system employing the adjustable belt tensioner.

FIG. 12 is a schematic of a tensioner sub-system in which all of the important locations are made in a factory environment which permits essentially any degree of accuracy to be attained. Thus, tensioner 520 is provided with idler pulley 523 engaging belt 512 and secured to a mounting plate 526 by lock screw 525 and pivot screw 522. The belt 512 can approach or leave the sub-system over straddling idler pulleys 527,527 at any angle between positions AB or CD without affecting the tension in the system. This device can be located anywhere in the system with equal effectiveness and its performance will be undiminished by location errors if these errors do not unduly affect the length of the belt in the system.

Figure 3:
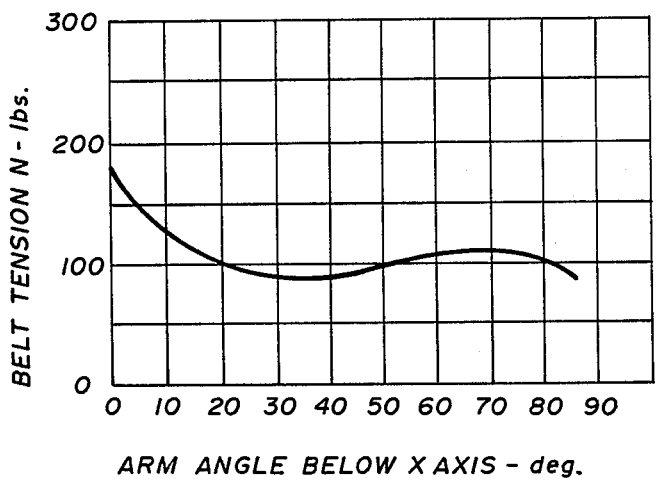
FIG. 3 is a graph useful in describing the performance of the optimized adjustable belt tensioner showing the result belt tension from an applied torque at various angles.
Figure 13:
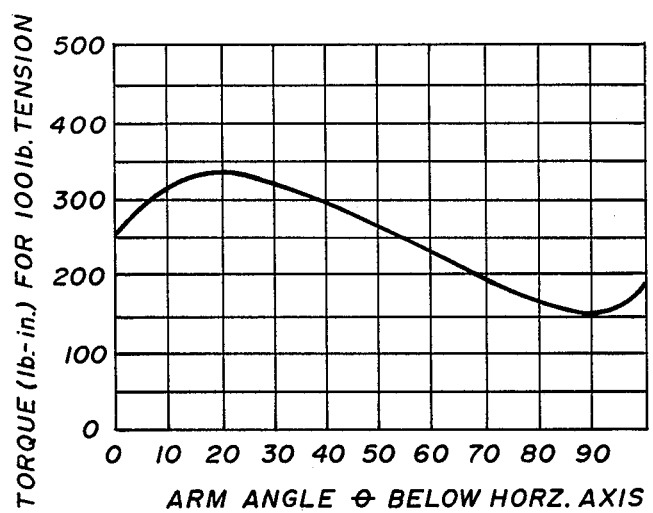
FIG. 13 is a graph useful in describing the performance of the exemplary sub-system of FIG. 12.

The operation of this device is exactly the same as that depicted by FIG. 2. All of the FIG. 12 parameters are controlled by the factory made mounting plate, idler pulleys, and tensioner, and they will be maintained as long as the device is placed in the system so that the belt contacts the straddling idler pulleys, i.e., so that the angles $\alpha$ and $\beta$ are maintained. A constant torque adjustable tensioner with performance of the type depicted by FIG. 3 is the most logical and preferred configuration, if space permits its usage. When such tensioner is not used, varying torque values as depicted in FIG. 13 are likely to result. FIG. 13 is an example of torque variation for 100 lbs. tension applied over arm angles of 0° to 100°.

If an automatic tensioner, such as that described by U.S. Pat. No. 4,557,709, is used in the sub-system, the torque required to maintain constant tension, again, will vary as the arm angle as described in general by FIG. 13. Proper design of the automatic tensioner will provide it with a torque output that exactly matches the torque requirements of FIG. 13. Consequently, the system can be designed to provide constant static tension through an angle $\theta$ of about 22° to 82° in the system illustrated by FIG. 13.

While a full and complete description of the invention has been set forth in accordance with the dictates of the patent statutes, it will be understood that modifications can be resorted to without departing from the spirit hereof or the scope of the appended claims.

Thus, it will be noted that various different structural arrangements have been disclosed, all of which, however, having in common the fact that the predetermined value is set by torquing adjustment through the central pivot axis of the apparatus to achieve a predetermined torque value which will suffice throughout operation of the belt system.

What is claimed is:

1. A method of maintaining proper tension in belt or chain drive systems comprising the steps of:
   (A) providing a tensioning assembly, one end of which is attached to a mounting surface and the other end of which is disposed adjacent the belt or chain;
   (B) attaching the said one end on the mounting surface loosely to permit unrestrained pivotal movement about a central axis but negligible axial movement;
   (C) applying a torquing tool to the mounting point and rotating the tensioning assembly about the central axis until said other end engages the belt or chain;
   (D) continuing rotation about the central axis until a predetermined torque value is attained; and
   (E) locking said tensioning assembly against further rotation.

2. A method, as set forth in claim 1, further comprising the step of mounting a tensioner body on said mounting surface and providing a tensioner pulley on the opposing end of said tensioning assembly.

3. A method, as set forth in claim 1, further comprising the step of predetermining said torque by the mathematical relation $$M = 2(T \times Z) \times \sin(\delta) \times \sin((\alpha + \beta)/2)$$

wherein M is the torque which is to be applied at arm angle $\theta$, T is the target belt tension, Z is the center-to-center length of said tensioner, $\delta$ is the tensioner idler pulley angle, and $\alpha$ and $\beta$ are angles of the upstream and downstream sheaves.

4. A pivoted arm belt or chain tensioner having an elongate arm, comprising:
   (A) pivotable mounting means about one end of said elongate arm for affixing said tensioner to a mounting base;
   (B) a tensioner idler pulley attached to the opposing end of said elongate arm for engagement with the belt and for application of a predictable tension thereto;
   (C) torquing means carried by said arm;
   (D) locking means carried by said arm prohibiting any apparent axial motion yet permitting said arm to pivot about said mounting, and
   (E) tension measuring means for measuring the predetermined design condition of the tensioner.

5. A belt or chain tensioner according to claim 4, wherein said torquing means is centrally located about said mounting means for receiving a predetermined torque.

6. A belt or chain tensioner according to claim 5, wherein said torquing means imparts a predetermined tension to said belt means through said idler pulley; said tension varying with the angle of said arm.

7. A belt or chain tensioner according to claim 6, wherein said torquing means includes a pivot screw provided with a suitably configured torquing head.

8. A belt or chain tensioner according to claim 6, wherein said locking means secures said tensioner at said predetermined tension.

9. A belt or chain tensioner according to claim 8, wherein said locking means includes a lock screw and a retaining nut; and said lock screw is received within an arcuate slot formed on the peripheral edge of said arm.

10. A belt or chain tensioner according to claim 4, wherein said tension measuring means enables measurement of said predetermined tension imparted from said predetermined torque.

11. A belt or chain tensioner according to claim 10, wherein said tension measuring means includes angle markings carried by said arm and a matched pointer which is affixed to said mounting base.

12. A belt or chain tensioner according to claim 10, wherein said tension measuring means includes a calibrated torque wrench which is temporarily engagable with said torquing means.

13. A belt or chain tensioner according to claim 4 wherein said arm includes a hub; a concentric bushing received within said hub; and said mounting means include a lock screw disposed concentrically within said bushing.

14. A belt or chain tensioner according to claim 4 wherein said arm includes a hub; said mounting means include a pivot screw disposed within said hub; and said arm also includes retaining means for engaging said hub.

15. A belt or chain tensioner according to claim 14 wherein one-way locking means are carried by said arm for engagement with said hub whereby said retaining means prevent axial separation of said hub from said arm and said locking means prevent rotational movement of said hub in one direction.

16. A belt or chain tensioner according to claim 15 wherein said locking means include a flattened recess in said arm; a complementally shaped locking slide receivable in said recess; a slide spring received in said recess and bearing against said locking slide; and a closing plug received in said recess.

17. A belt or chain tensioner according to claim 4 wherein a bushing assembly is received on said end of said arm adjacent said mounting means; said bushing assembly including a bushing and inner and outer hoops concentric with said bushing and said mounting means.

18. A belt or chain tensioner according to claim 17 wherein said mounting means include a clamping screw; a hub is carried by said arm in encircling relationship with said clamping screw and radially inboard of said inner hoop.

19. A belt or chain tensioner according to claim 18 wherein a one-way locking slide is disposed on said arm in engagement with said hub.

20. A belt or chain tensioner according to claim 18 wherein said inner and outer hoops are rotationally movable relatively of said bushing.

* * * * *

UNITED STATES PATENT AND TRADEMARK OFFICE
CERTIFICATE OF CORRECTION

PATENT NO. : 4,767,383
DATED : August 30, 1988
INVENTOR(S) : RICHARD C. ST. JOHN It is certified that error appears in the above-identified patent and that said Letters Patent are hereby corrected as shown below:

In Column 1, Line 20, delete "problems" and substitute therefor --problem--.

In Column 1, Line 60, delete "n" and substitute therefor --in--.

In Column 2, Line 21, delete "diminished" and substitute therefor --diminishes--.

In Column 2, Line 23, delete "powdered" and substitute therefor --powered--.

In Column 3, Line 30, delete "result" and substitute therefor --resultant--.

In Column 4, Line 8, delete "numberal" and substitute therefor --numeral--.

In Column 4, Line 40, after the second "Sin" word, insert --(--.

In Column 4, Line 47, delete "take" and substitute therefor --taken--.

In Column 4, Line 54, immediately after "lb.-", insert --in --.

In Column 7, Line 10, delete "unit" and substitute therefor --nut--.

UNITED STATES PATENT AND TRADEMARK OFFICE
CERTIFICATE OF CORRECTION

PATENT NO. : 4,767,383

DATED : August 30, 1988

INVENTOR(S) : RICHARD C. ST. JOHN

It is certified that error appears in the above-identified patent and that said Letters Patent is hereby corrected as shown below:

In Column 7, line 14, after the word "can", insert --then--.

In Column 9, line 19, after the word "this", insert --is--.

Signed and Sealed this

Twenty-fourth Day of January, 1989

Attest:

DONALD J. QUIGG

Attesting Officer

Commissioner of Patents and Trademarks